United States Patent
Son et al.

(10) Patent No.: US 9,104,565 B2
(45) Date of Patent: Aug. 11, 2015

(54) FAULT TRACING SYSTEM AND METHOD FOR REMOTE MAINTENANCE

(75) Inventors: Ji Yeon Son, Daejeon (KR); Ji Hyun Lee, Daejeon (KR); Jeu Young Kim, Seoul (KR); Jun Hee Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 37 days.

(21) Appl. No.: 13/472,628

(22) Filed: May 16, 2012

(65) Prior Publication Data

US 2013/0173965 A1 Jul. 4, 2013

(30) Foreign Application Priority Data

Dec. 29, 2011 (KR) .................. 10-2011-0145564
Mar. 23, 2012 (KR) .................. 10-2012-0029826

(51) Int. Cl.
G06F 11/00 (2006.01)
G06F 11/07 (2006.01)
G06F 11/34 (2006.01)
G06F 11/22 (2006.01)
H04L 12/24 (2006.01)

(52) U.S. Cl.
CPC .......... *G06F 11/0748* (2013.01); *G06F 11/079* (2013.01); *G06F 11/2294* (2013.01); *G06F 11/3466* (2013.01); *H04L 41/0631* (2013.01)

(58) Field of Classification Search
CPC .... G06F 11/3466; G06F 9/3005; G06F 11/30
See application file for complete search history.

(56) References Cited

U.S. PATENT DOCUMENTS

| | | | | |
|---|---|---|---|---|
| 4,959,849 A * | 9/1990 | Bhusri | | 379/32.01 |
| 7,176,792 B2 * | 2/2007 | Pereira et al. | | 340/506 |
| 7,292,898 B2 * | 11/2007 | Clark et al. | | 700/9 |
| 7,877,642 B2 * | 1/2011 | Ding et al. | | 717/133 |
| 8,336,033 B2 * | 12/2012 | Schmelter et al. | | 717/131 |
| 8,478,948 B2 * | 7/2013 | Panchenko et al. | | 711/154 |
| 8,527,976 B2 * | 9/2013 | Kahlon et al. | | 717/152 |
| 8,600,915 B2 * | 12/2013 | Thompson | | 706/12 |
| 8,880,923 B2 * | 11/2014 | Saunders et al. | | 713/323 |
| 2004/0049714 A1 * | 3/2004 | Marples et al. | | 714/43 |
| 2005/0146426 A1 * | 7/2005 | Pereira et al. | | 340/506 |
| 2005/0181835 A1 * | 8/2005 | Lau et al. | | 455/567 |
| 2006/0112061 A1 * | 5/2006 | Masurkar | | 706/47 |
| 2008/0133970 A1 * | 6/2008 | Son et al. | | 714/26 |
| 2010/0118710 A1 | 5/2010 | Ogawa et al. | | |
| 2012/0054785 A1 * | 3/2012 | Yang et al. | | 725/16 |
| 2012/0158639 A1 * | 6/2012 | Moore et al. | | 706/55 |
| 2012/0254707 A1 * | 10/2012 | Cooke | | 714/799 |
| 2014/0012882 A1 * | 1/2014 | Poppitz | | 707/792 |

OTHER PUBLICATIONS

Hitesh Ballani and Paul Francis Cornell University, Ithaca, NY, Fault Management Using the CONMan Abstraction, IEEE, 2009.*

* cited by examiner

*Primary Examiner* — Amine Riad
(74) *Attorney, Agent, or Firm* — Nelson Mullins Riley & Scarborough LLP (57) ABSTRACT

Provided is a fault tracing system and method for remote maintenance. The fault tracing method includes detecting faults by receiving error events or fault diagnosis request messages, generating transactions for the detected faults, tracing the faults according to the transactions, and notifying a client terminal or user of the fault diagnosis results. Accordingly, it is possible to accurately trace a fault even in a home/building network environment complicatedly consisting of various resources.

9 Claims, 9 Drawing Sheets

| FAULT SYMPTOM ATTRIBUTE | DESCRIPTION |
|---|---|
| SESSION ID | USER SESSION ID |
| TARGET RESOURCE ID | FAULT DIAGNOSIS-TARGET RESOURCE ID |
| SOURCE RESOURCE ID | DATA/CONTROL MESSAGE TRANSMISSION RESOURCE ID |
| ERROR TYPE | OCCURRING ERROR EVENT |
| COMMAND | USER EXECUTION COMMAND |

FAULT TRACING SYSTEM AND METHOD FOR REMOTE MAINTENANCE

CROSS-REFERENCE TO RELATED APPLICATION

This application claims priority to and the benefit of Korean Patent Application No. 2011-0145564 filed on Dec. 29, 2011 and No. 2012-0029826 filed on Mar. 23, 2012, the disclosures of which are incorporated herein by reference in its entirety.

BACKGROUND

1. Field of the Invention

The present invention relates to a fault tracing system and method for remote maintenance, and more particularly, to a fault tracing system and method for remote maintenance capable of accurately and effectively tracing a fault that has occurred in a home network using home network resource information and relationship information among resources for the purpose of remote maintenance in a home/building network environment.

2. Discussion of Related Art

In general, a home network indicates a network in which various digital appliances are connected with each other such that a user can enjoy convenient, safe and economical everyday services any time in or outside the home. Refrigerators, washing machines, etc. referred to as white goods, are gradually being digitalized with the development of digital signal processing technology, and new information appliances have emerged as home appliance operating system and high-speed multimedia communication technologies have been integrated into digital appliances, resulting in the development of the home network.

Most existing technologies for a method of diagnosing and handling a fault of various electronic devices and network equipment present in a house or building, or software operating in them, find a fault by analyzing a system log or error messages.

For example, US Laid-Open Patent Publication No. 2010-0118710 relates to a computer program for detecting failure of a network including a plurality of transmitting devices, by tracing data flows of the transmitting devices on the basis of physical topologies of the transmitting devices corresponding to the network, and discloses a virtual transmitting device composing step of composing a group of transmitting devices adjacent to one another, the data flows of which have failed to be obtained, as one virtual transmitting device, and a physical topology replacement step of replacing physical topologies of the group of transmitting devices adjacent to one another, the data flow rates of which have failed to be obtained, among the physical topologies with a physical topology of the composed virtual transmitting device.

The related art as mentioned above has some problems. As the size of a system log or messages to be analyzed increases, overhead drastically increases. Also, when the same error is repeatedly caused by several components relating to a single fault, it is difficult to systematically trace the fault.

Furthermore, when a fault has occurred in a home/building network environment, the related art involves a user accurately recalling and describing the situation in which the fault has occurred, and an expert or engineer visiting the home or building in person, which is inconvenient and causes a delay in detection and diagnosis of the fault.

SUMMARY OF THE INVENTION

The present invention is directed to a fault tracing system and method for remote maintenance capable of accurately and effectively tracing a fault that has occurred in a home network using home network resource information and relationship information among resources for the purpose of remote maintenance in a home/building network environment.

According to an aspect of the present invention, there is provided a fault tracing method for remote maintenance including: (a) detecting faults by receiving error events or fault diagnosis request messages; (b) generating transactions for the detected faults; (c) tracing the faults according to the transactions: and (d) notifying a client terminal or user of the fault diagnosis results.

Preferably, (a) may include generating fault symptom information.

(c) may include: (c1) configuring a sub-map by removing resources and resource relation information unnecessary to trace the corresponding fault from a resource relation map; (c2) probing a resource; (c3) selecting a subsequent domain so as to select the next resource to be probed; and (c4) selecting a resource of the selected subsequent domain to be probed according to the result of (c2).

Preferably, (c1) may include removing the resources that are not connected with the corresponding resources through relation objects using fault symptom information including source resource identity (ID) or target resource ID information.

Preferably, (c3) may include selecting the subsequent domain in order of decreasing domain dependency degree.

Preferably, (c4) may include selecting an uplink or parent node resource when the resource probing of (c2) fails, and randomly selecting the next resource when the resource probing of (c2) succeeds.

According to another aspect of the present invention, there is provided a fault tracing system performing a fault tracing method for remote maintenance, the system including: a fault diagnosis client terminal; a fault diagnosis server connected to the fault diagnosis client terminal via a network and having a fault diagnotor and a resource relation information management controller; home or building network resources connected with the fault diagnosis server via a network; and a database connected to the fault diagnotor of the fault diagnosis server, and configured to store policy and fault history information.

Preferably, the fault diagnotor may include: an event receiver module configured to receive a message generated from the system or the fault diagnosis client terminal; a diagnotor management module configured to provide an overall management function of initialization, termination, etc. of the fault diagnotor; a transaction management module configured to analyze a message generated from the event receiver module and generate a transaction; a resource relation map management module configured to obtain resource relation information from the resource relation information management controller, generate a resource relation map, and manage updating according to an event; a diagnosis result notification module configured to notify the fault diagnosis client terminal of a fault diagnosis result; a data management module configured to store and collect the information in the database; and a fault tracing module configured to trace and determine a fault using the resource relation map. Here, tracing of the fault may construct a sub-map by removing resources and resource relation information unnecessary to trace the fault from the resource relation map, probe a resource, select a subsequent domain so as to select the next resource to be probed, and select a resource of the selected subsequent domain to be probed according to the result of the resource probing.

Preferably, the tracing of the fault may select the subsequent domain in order of decreasing domain dependency degree, select an uplink or parent node resource when the resource probing fails, and randomly select the next resource when the resource probing succeeds.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

Figure 1:
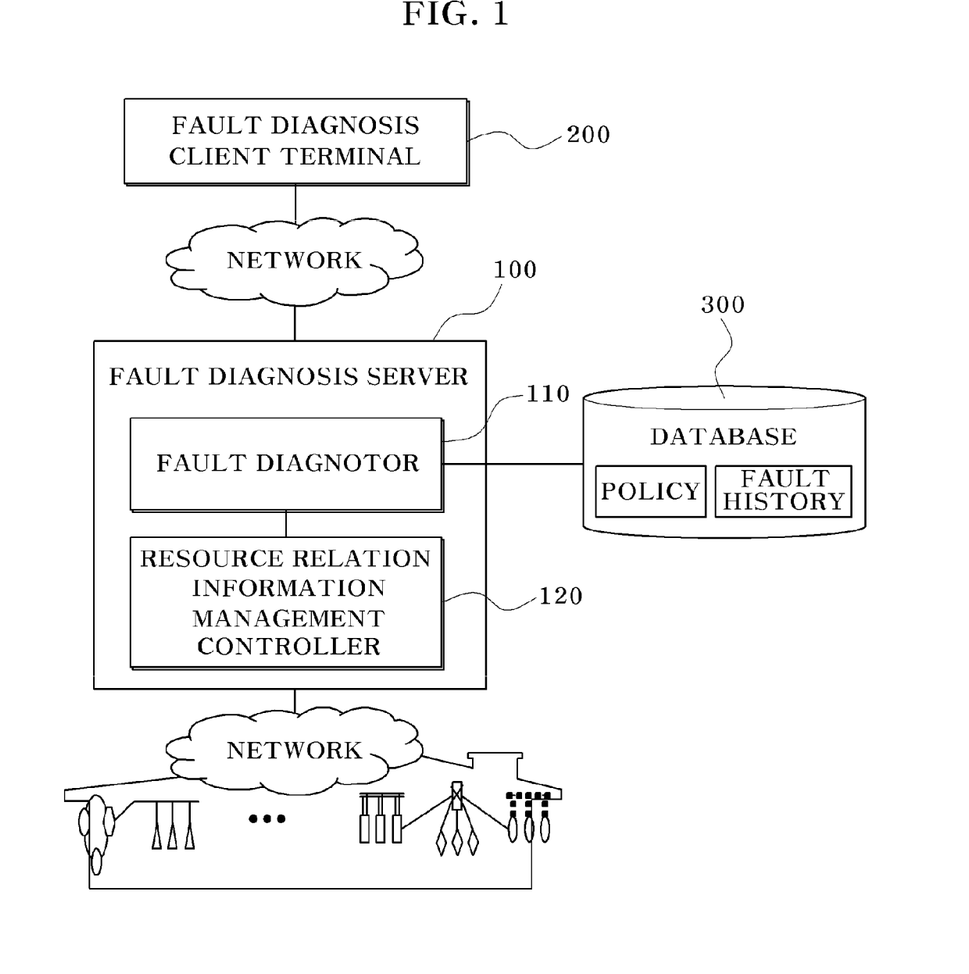
FIG. 1 is an overall block diagram of a fault tracing system for remote maintenance according to an exemplary embodiment of the present invention.

FIG. 1 is an overall block diagram of a fault tracing system for remote maintenance according to an exemplary embodiment of the present invention.

Referring to FIG. 1, a fault tracing system for remote maintenance according to an exemplary embodiment of the present invention includes a fault diagnosis client terminal 200, a fault diagnosis server 100, and a database 300.

Here, the fault diagnosis client terminal 200 is connected with the fault diagnosis server 100 via a network, and the fault diagnosis server 100 is connected with home/building network resource via a network. The fault diagnosis server 100 includes a fault diagnotor 110 and a resource relation information management controller 120, and the fault diagnotor 110 is connected with the database 300. The database 300 stores policy and fault history information.

Figure 2:
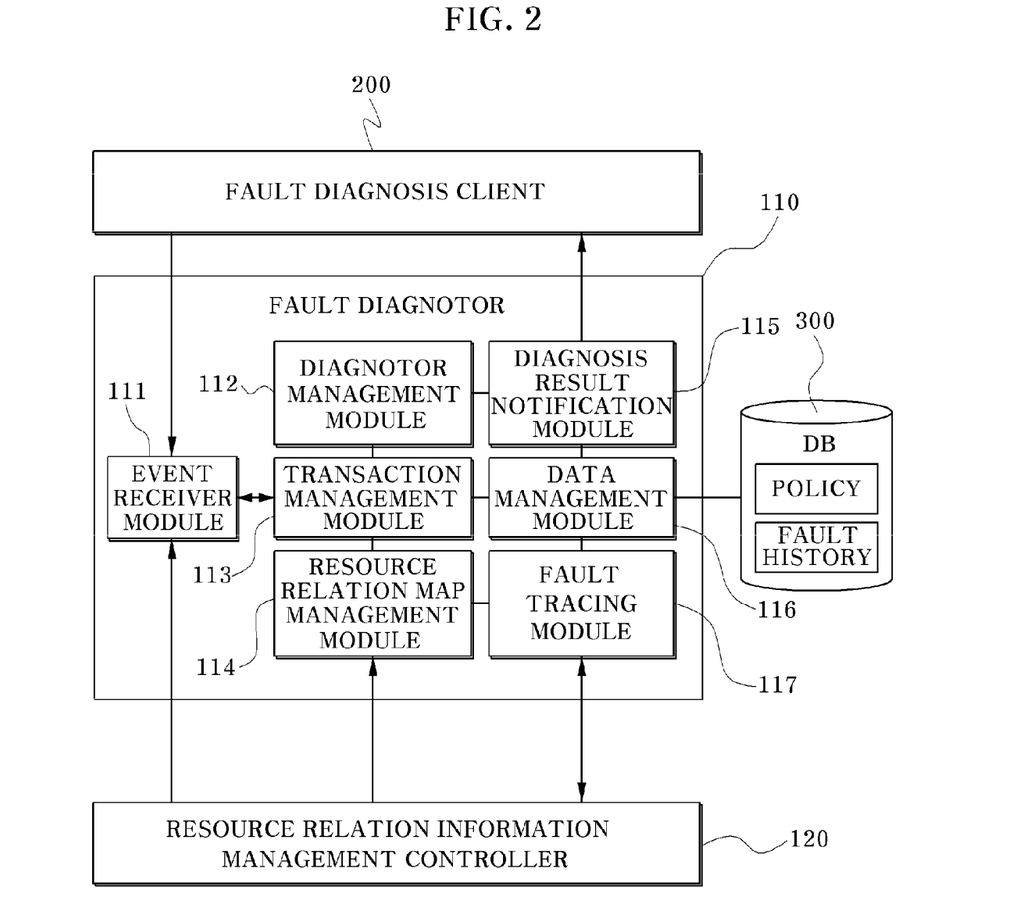
FIG. 2 is a detailed block diagram of a fault diagnotor applied to an exemplary embodiment of the present invention.

FIG. 2 is a detailed block diagram of a fault diagnotor shown in FIG. 1.

Referring to FIG. 2, the fault diagnotor 110 applied to an exemplary embodiment of the present invention generally includes an event receiver module 111, a diagnotor management module 112, a transaction management module 113, a resource relation map management module 114, a diagnosis result notification module 115, a data management module 116, and a fault tracing module 117.

Here, the event receiver module 111 receives all messages generated from the system or the fault diagnosis client 200. Also, the event receiver module 111 may have a function of storing a command log for message processing.

The diagnotor management module 112 provides an overall management function of initialization, termination, etc. of the fault diagnotor 110.

The transaction management module 113 functions to analyze a message generated from the event receiver module 111 and generate a transaction.

The resource relation map management module 114 functions to obtain resource relation information from the resource relation information management controller 120, generate a resource relation map, and manage updating according to event.

The diagnosis result notification module 115 functions to notify the fault diagnosis client 200 of fault diagnosis results.

The data management module 116 functions to store and collect the information in the database 300.

The fault tracing module 117 functions to trace and determine a fault using the resource relation map.

Figure 3:
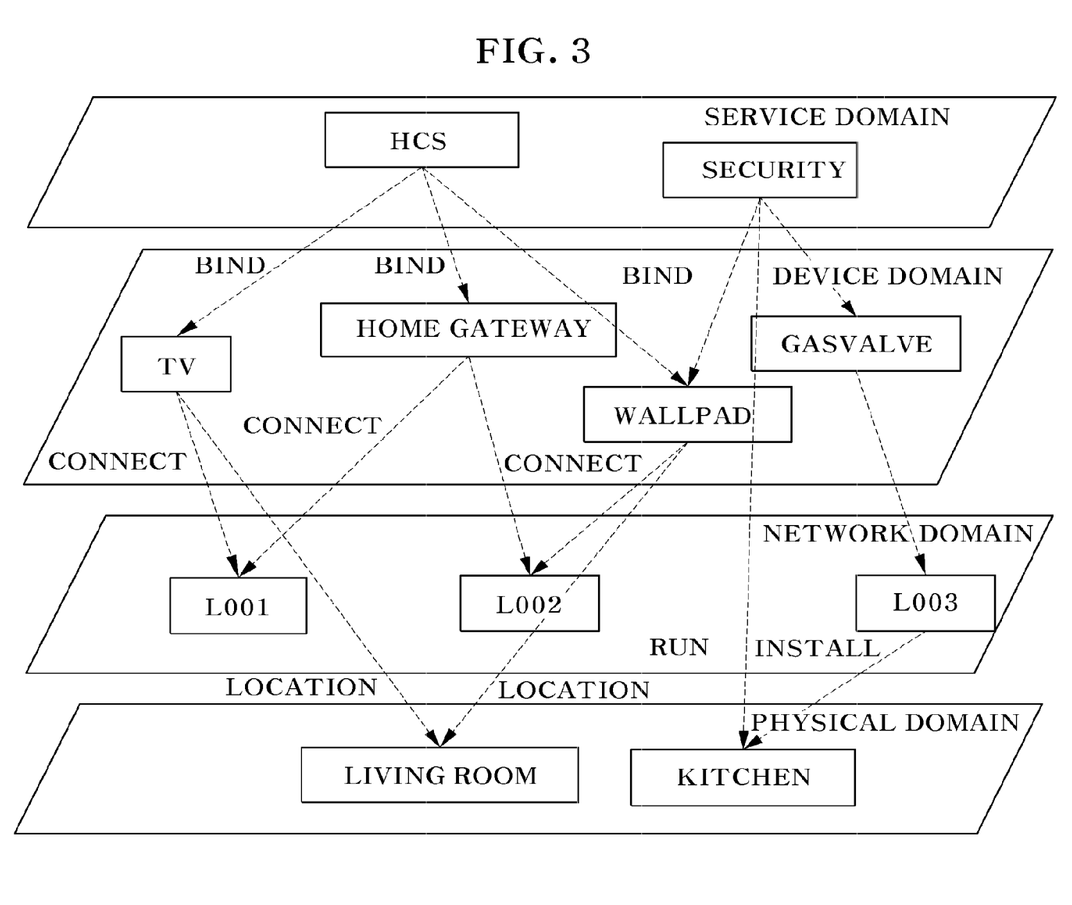
FIG. 3 illustrates an example of network relation among resources managed by a resource relation map management module of FIG. 2.
Figure 4:
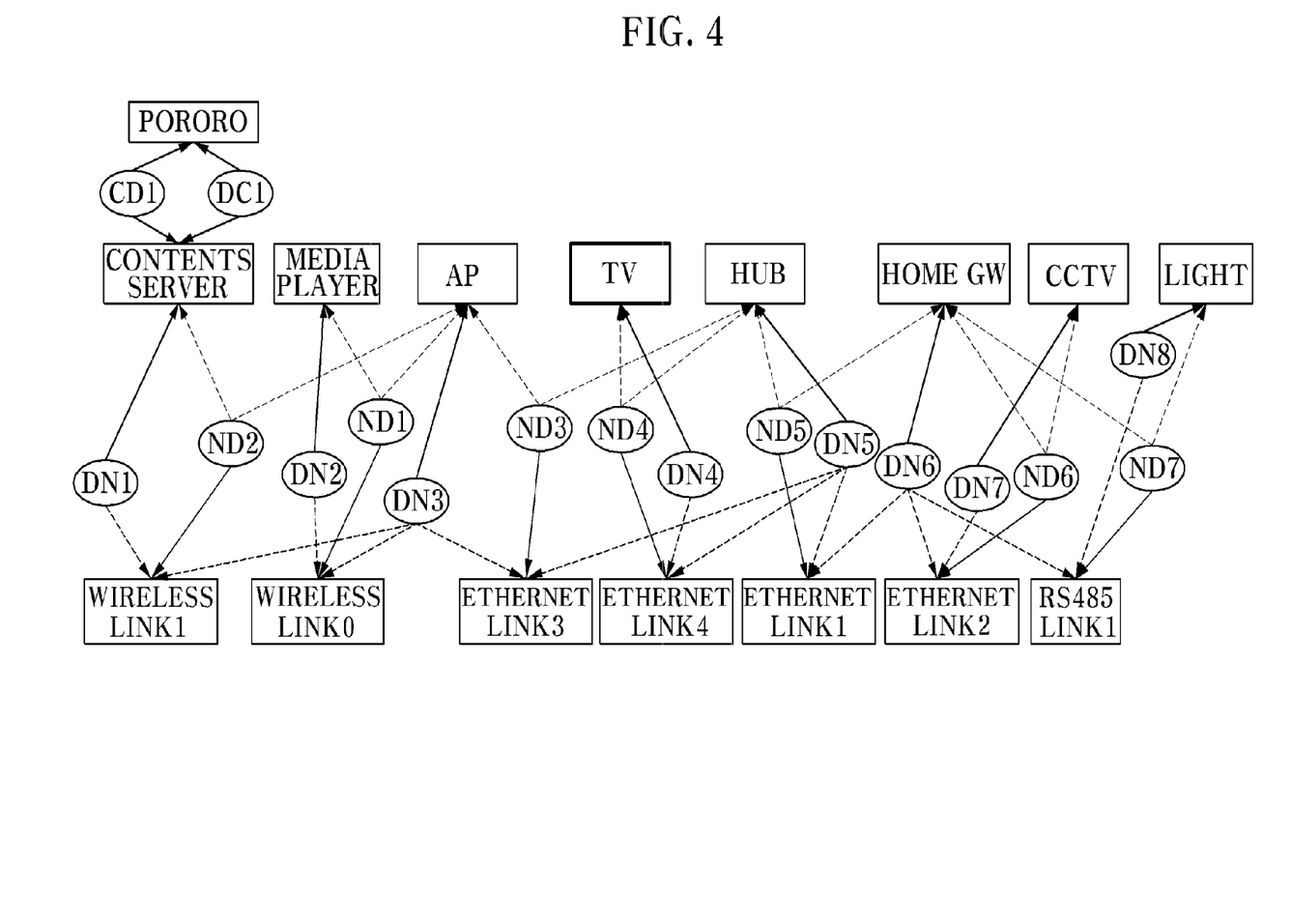
FIG. 4 illustrates an example of a resource relation map generated for resources, of which relation is set as illustrated in FIG. 3, in a house or building by the resource relation map management module.

FIG. 3 illustrates an example of network relation among resources managed by the resource relation map management module 114 of FIG. 2, and FIG. 4 illustrates an example of a resource relation map generated for resources, of which relation is set as illustrated in FIG. 3, in a house or building by the resource relation map management module 114.

Referring to FIG. 3, resources managed in a house, building, etc. may be various electronic devices, such as a television (TV), network equipment connecting the respective electronic devices to a network, service, physical spaces, and so on. The resource relation map management module 114 stratifies resources that are management targets present in a house, building, etc. into domains, such as a service domain, a device domain, a network domain and a physical domain, according to resource type, and sets relation among the resources present in the respective domains.

Referring to FIG. 4, a resource relation map defines the relation of respective resources belonging to stratified domains, and is a graph model having resource objects and relation objects as entities.

Resource entities may include various kinds of attribute information, such as names, types, identities (IDs), state information, and available functions, on resources managed in a house or building. Object entities define the relation among different domains, and may include relation names, types, IDs, source resource objects, and target resource objects.

A fault tracing method for remote maintenance according to an exemplary embodiment of the present invention will be described below with reference to FIGS. 5 to 11.

Figure 5:
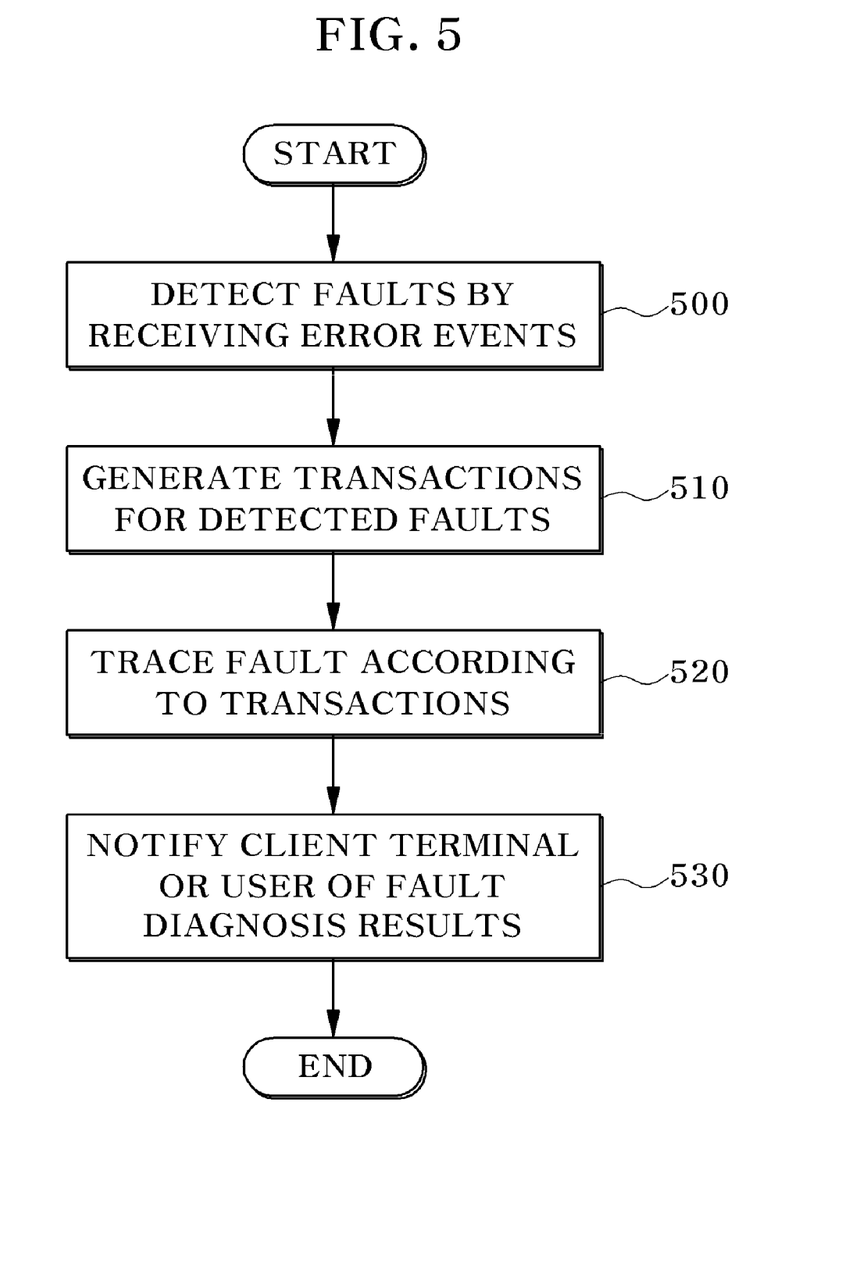
FIG. 5 is an overall flowchart illustrating a fault tracing method for remote maintenance according to an exemplary embodiment of the present invention.
Figure 6:
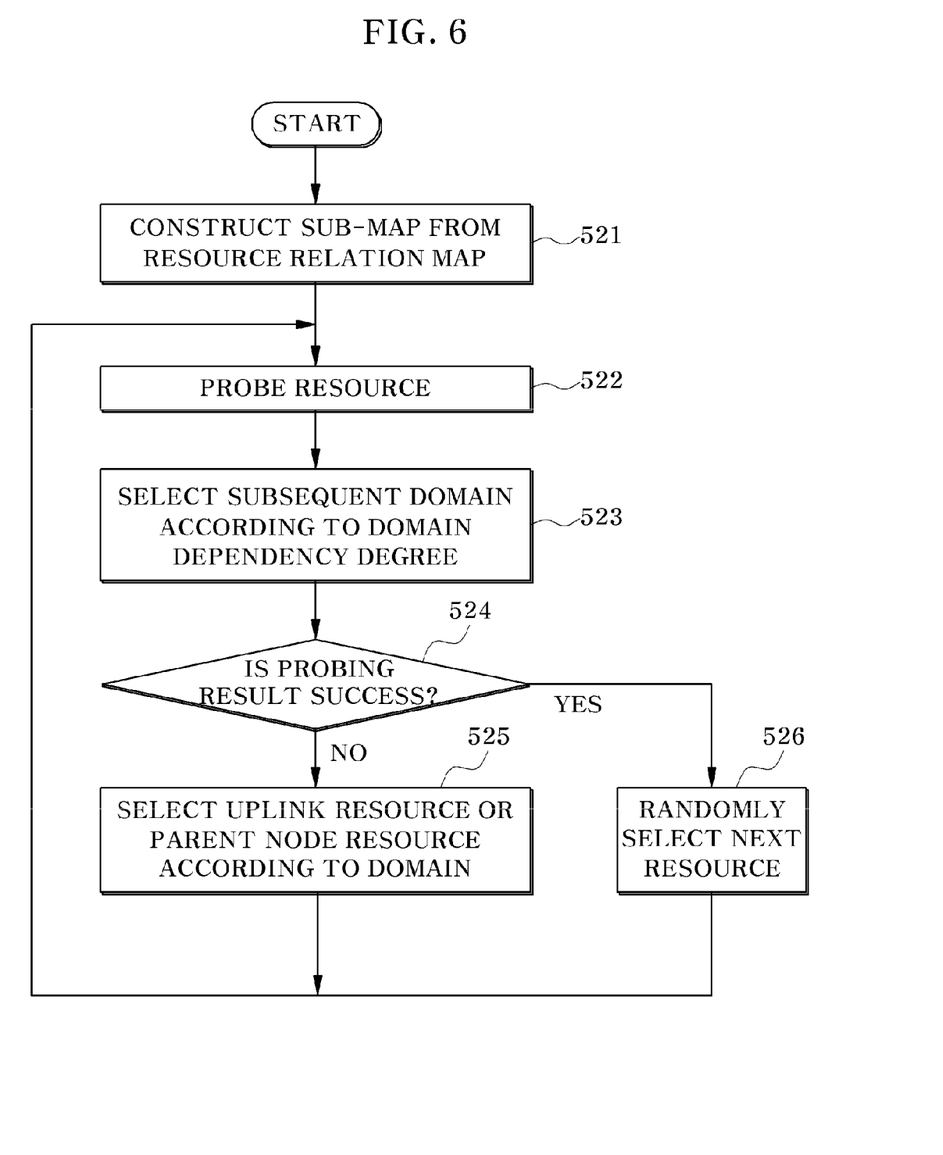
FIG. 6 is a detailed flowchart illustrating step 520 of FIG. 5.
Figure 7:
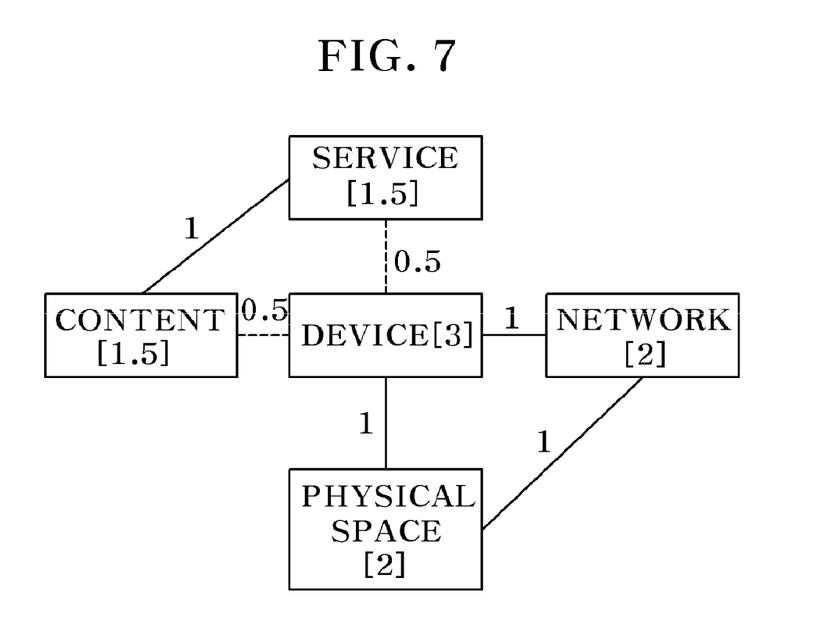
FIG. 7 is a block diagram illustrating domain dependency relations applied to an exemplary embodiment of the present invention.

FIG. 5 is an overall flowchart illustrating a fault tracing method for remote maintenance according to an exemplary embodiment of the present invention, and FIG. 6 is a detailed flowchart illustrating step 520 of FIG. 5. FIG. 7 is a block diagram illustrating domain dependency relations applied to an exemplary embodiment of the present invention.

Referring to FIG. 5, in a fault tracing method for remote maintenance according to an exemplary embodiment of the present invention, a fault is detected by receiving an error event from a system or a fault diagnosis request message from a user (step 500).

Figure 8:
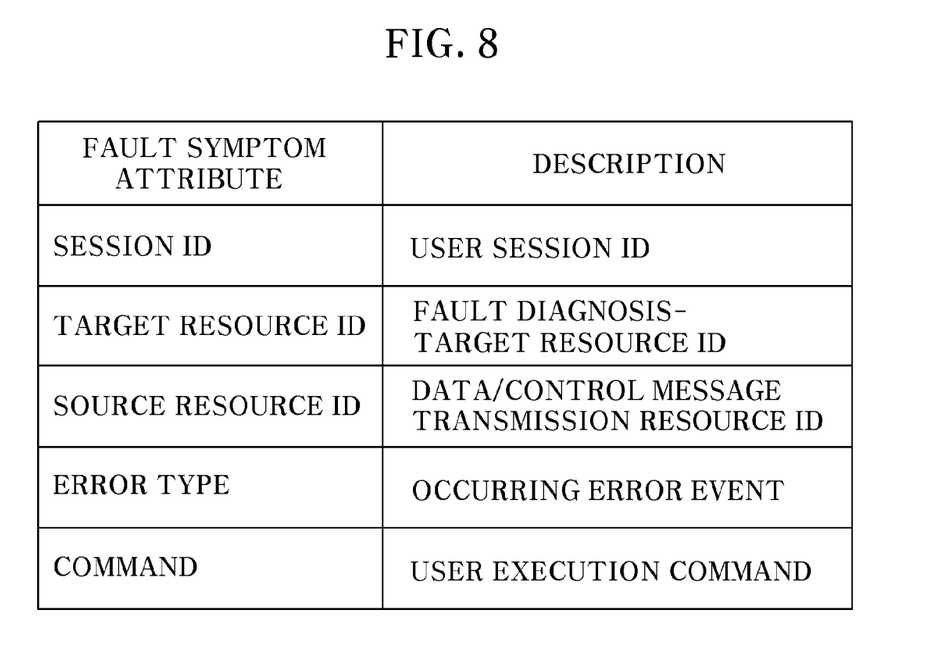
FIG. 8 is a table of examples of fault symptoms generated in a fault detection step of a fault tracing method for remote maintenance according to an exemplary embodiment of the present invention.

Examples of fault symptoms generated in such a fault detection step will be described with reference to FIG. 8. Referring to FIG. 8, the fault detection step in the fault tracing method for remote maintenance according to an exemplary embodiment of the present invention may generate fault symptom information when performing fault detection by receiving an error event from the system or a fault diagnosis request message from a user.

Checking an example of such a fault symptom, fault symptom attributes may include a "session ID" (user session ID), a "target resource ID" (fault diagnosis-target resource ID), a "source resource ID" (data/control message transmission resource ID), an "error type" (occurring error event), a "command" (user execution command), and so on.

Subsequently, transactions are generated for the detected faults (step 510). Since fault tracing proceeds according to error events or user requests received by the system, when a plurality of error events are received or a plurality of diagnosis requests are received from a user, a fault needs to be traced in each case. Thus, transactions are required such that a plurality of fault tracing processes separately proceed.

Subsequently, the faults are traced according to the transactions (step 520), and the user is notified of the fault diagnosis results (step 530).

A method of tracing faults according to transactions will be described in detail below with reference to FIG. 6.

Referring to FIG. 6, first, a sub-map is extracted from a resource relation map (step 521). Specifically, the sub-map is constructed by removing resources and relation objects that do not relate to a fault diagnosis target from the resource relation map. In the worst case, the resource relation map may be the sub-map as it is. The sub-map may be constructed by removing resources that are not connected with the corresponding resources through relation objects, for example, using the "source resource ID" and the "target resource ID" of the fault symptom information.

Subsequently, each resource is probed (step 522). At first, a target resource, which is the fault diagnosis target, may be probed and marked as having been probed.

Here, a method of probing a resource may vary according to resource type or implementation system. For example, device probing, network link probing, service probing or content probing may be performed. Device probing is enabled by a ping test, a device information request message, or the like, and network link probing may be performed by a "network trace route" command, a network information request message, or the like. Service probing is enabled by a service information request message, a service control command, or the like, and content probing may be performed by a content inquiry command or an access control command.

Subsequently, a subsequent domain is selected according to its domain dependency degree (step 523). As illustrated in FIG. 7, according to resource types, domains may be defined as, for example, a device domain, a network domain, a physical space domain, a service domain, and so on. Meanwhile, when a domain dependency degree between domains that do not include each other is 1, and a domain dependency degree between domains one of which includes the other is 0.5, domain dependency degrees of the respective domains may be determined as shown in FIG. 7. Here, the higher the degree of a domain, the higher a probability that a fault will be detected in the domain.

Thus, relation domains connected to a domain of the resource that has been initially probed are selected as the next relation domain in order of decreasing dependency degree. In other words, referring to the example of FIG. 7, the network domain or the physical space domain may be selected after the device domain, and then the service domain or the content domain may be selected.

Subsequently, according to whether or not the probing of step 522 has succeeded (step 524), an uplink or parent node resource is selected according to the subsequent domain (step 525), or the next resource is randomly selected (step 526).

Meanwhile, a device failure is generally a downlink failure, and a network failure is generally a child node failure. Thus, when the probing of step 522 has failed, an uplink or parent node is selected as the next resource according to the subsequent domain (step 525).

On the other hand, when the probing of step 522 has succeeded, one of resources of the subsequent domain is randomly selected (step 526) because the resources have the same probability of fault as the next resource.

When the next resource is selected in step 525 or step 526 in this way, the process proceeds to step 522, and the selected resource is probed.

Figure 9:
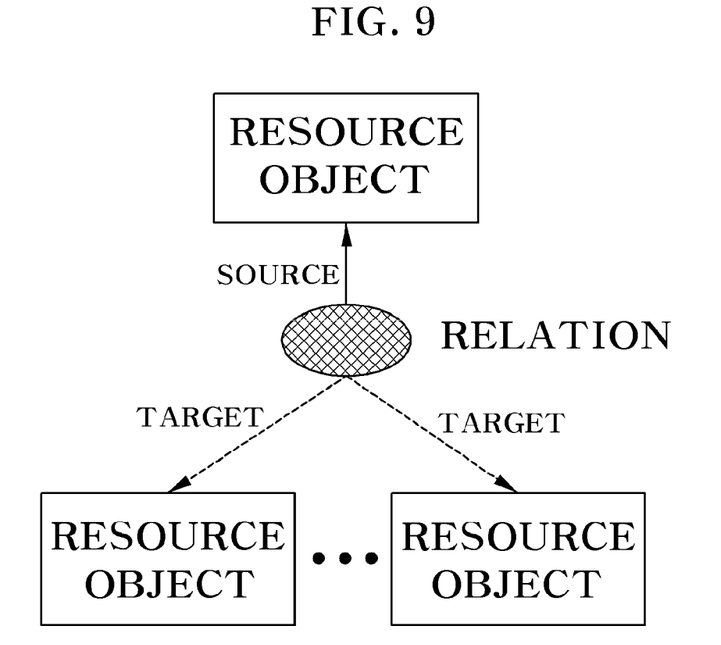
FIG. 9 is a block diagram illustrating resource relation map entities used in a fault tracing step of a fault tracing method for remote maintenance according to an exemplary embodiment of the present invention.

FIG. 9 is a block diagram illustrating resource relation map entities used in a fault tracing step of a fault tracing method for remote maintenance according to an exemplary embodiment of the present invention. Referring to FIG. 9, a resource relation map used in the fault tracing step of a fault tracing method for remote maintenance according to an exemplary embodiment of the present invention is a graph model having a resource object and a relation object as entities.

Such a resource object may include various kinds of attribute information, such as a name, a type, an ID, state information, and an available function, on a target resource. An object entity defines the relation among different domains, and may include a relation name, a type, an ID, source resource objects, and target resource objects.

Figure 10:
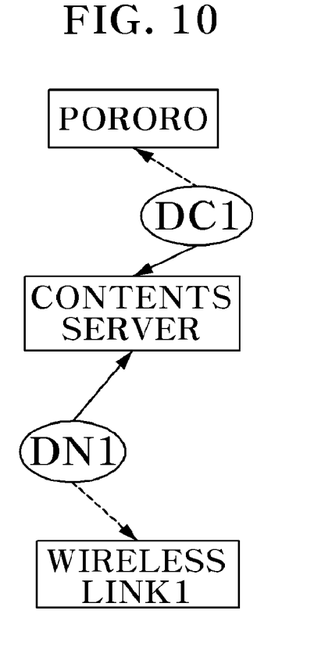
FIG. 10 illustrates an example of selecting a subsequent domain using a resource dependency degree in a fault tracing step of a fault tracing method for remote maintenance according to an exemplary embodiment of the present invention.

FIG. 10 illustrates an example of a sub-step of selecting a subsequent domain using a resource dependency degree (step 523) in a fault tracing step of a fault tracing method for remote maintenance according to an exemplary embodiment of the present invention.

Referring to FIG. 10, when a domain for selecting the next resource is selected after a device resource "Contents Server" is probed, a network domain relation "DN1" having a higher resource dependency degree is selected between a relation "DC1" with a content domain and a relation "DN1" with a network domain. In FIG. 10, the device "Contents Server" includes content "Pororo" and is connected to "Wireless Link1" as a network connection.

Figure 11:
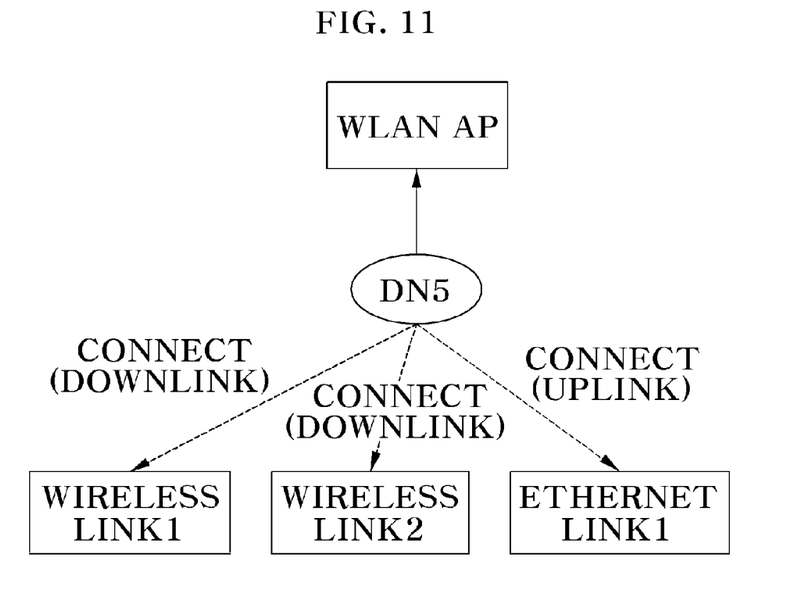
FIG. 11 illustrates a mechanism of determining progress direction on a resource relation map according to a result of probing a target resource and selecting the next target resource in a fault tracing step of a fault tracing method for remote maintenance according to an exemplary embodiment of the present invention.

FIG. 11 illustrates a sub-step of determining progress direction on a resource relation map according to a result of probing a target resource and selecting the next target resource (step 525) in a fault tracing step of a fault tracing method for remote maintenance according to an exemplary embodiment of the present invention.

Referring to FIG. 11, a wireless local area network (WLAN) access point (AP) is connected to an uplink "Ethernet Link1" and to downlinks "Wireless Link1" and "Wireless Link2." When the probing of the WLAN AP resource in step 524 of FIG. 6 results in failure and a network domain relation "DN5" is selected in step 523, the uplink "Ethernet Link1" is selected among "Wireless Link1," "Wireless Link2," and "Ethernet Link1" in step 525.

The above-described fault tracing system and method for remote maintenance according to exemplary embodiments of the present invention can effectively trace a fault that has occurred in a home network using home network resource information and relationship information among resources for the purpose of remote maintenance in a home/building network environment, and can accurately trace a fault even in a home/building network environment complicatedly consisting of various resources.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A fault tracing method for remote maintenance, comprising:
   (a) detecting faults by receiving error events or fault diagnosis request messages;
   (b) generating transactions for the detected faults;
   (c) tracing the faults according to the transactions, including (c1) constructing a sub-map by removing resources and resource relation information that are unnecessary to trace a corresponding fault from a resource relation map, (c2) probing a resource, (c3) selecting a subsequent domain so as to select a next resource to be probed, and (c4) selecting a resource of the selected subsequent domain to be probed according to the result of (c2); and
   (d) notifying a client terminal or user of the fault diagnosis results,
   wherein a domain is defined based on the type of resources in the domain.

2. The fault tracing method of claim 1, wherein (a) includes generating fault symptom information.

3. The fault tracing method of claim 2, wherein (c1) includes removing the resources that are not connected with the corresponding resources through relation objects using fault symptom information including source resource identity (ID) or target resource ID information.

4. The fault tracing method of claim 2, wherein (c3) includes selecting the subsequent domain in order of decreasing domain dependency degree.

5. The fault tracing method of claim 2, wherein (c4) includes selecting an uplink or parent node resource when the resource probing of (c2) fails, and randomly selecting a next resource when the resource probing of (c2) succeeds.

6. A fault tracing system performing a fault tracing method for remote maintenance, the system comprising:
   a fault diagnosis client terminal;
   a fault diagnosis server connected to the fault diagnosis client terminal via a network and having a fault diagnotor and a resource relation information management controller;
   home or building network resources connected with the fault diagnosis server via a network; and
   a database connected to the fault diagnotor of the fault diagnosis server, and configured to store policy and fault history information,
   wherein the fault diagnotor detects faults by receiving error events or fault diagnosis request messages and uses a sub-map, where resources and resource relation information that are unnecessary to trace a corresponding fault are removed from the sub-map.

7. The fault tracing system of claim 6, wherein the fault diagnotor includes:
   an event receiver module configured to receive a message generated from the system or the fault diagnosis client terminal;
   a diagnotor management module configured to provide an overall management function of initialization, termination, etc. of the fault diagnotor;
   a transaction management module configured to analyze a message generated from the event receiver module and generate a transaction;
   a resource relation map management module configured to obtain resource relation information from the resource relation information management controller, generate a resource relation map, and manage updating according to an event;
   a diagnosis result notification module configured to notify the fault diagnosis client terminal of a fault diagnosis result;
   a data management module configured to store and collect the information in the database; and
   a fault tracing module configured to trace and determine a fault using the resource relation map,
   wherein tracing of the fault constructs a sub-map by removing resources and resource relation information unnecessary to trace the fault from the resource relation map, probes a resource, selects a subsequent domain so as to select a next resource to be probed, and selects a resource of the selected subsequent domain to be probed according to the result of the resource probing.

8. The fault tracing system of claim 7, wherein the tracing of the fault selects the subsequent domain in order of decreasing domain dependency degree.

9. The fault tracing system of claim 7, wherein the tracing of the fault selects an uplink or parent node resource when the resource probing fails, and randomly selects a next resource when the resource probing succeeds.

* * * * *